Nov. 25, 1924.

J. WILKINSON 1,516,556

METHOD OF MANUFACTURING TURBINE BLADES

Filed Nov. 21, 1922

Inventor:
James Wilkinson,
by
His Attorney.

Patented Nov. 25, 1924.

1,516,556

UNITED STATES PATENT OFFICE.

JAMES WILKINSON, OF LYNN, MASSACHUSETTS, ASSIGNOR TO GENERAL ELECTRIC COMPANY, A CORPORATION OF NEW YORK.

METHOD OF MANUFACTURING TURBINE BLADES.

Application filed November 21, 1922. Serial No. 602,423.

*To all whom it may concern:*

Be it known that I, JAMES WILKINSON, a citizen of the United States, residing at Lynn, in the county of Essex, State of Massachusetts, have invented certain new and useful Improvements in Methods of Manufacturing Turbine Blades, of which the following is a specification.

The present invention relates to blades or buckets for elastic fluid turbines and especially blades or buckets of the hollow type. The object of my invention is to provide an improved method of manufacturing such blade, and for a consideration of what I believe to be novel, and my invention, attention is directed to the accompanying description and the claims appended thereto.

Figure 1:
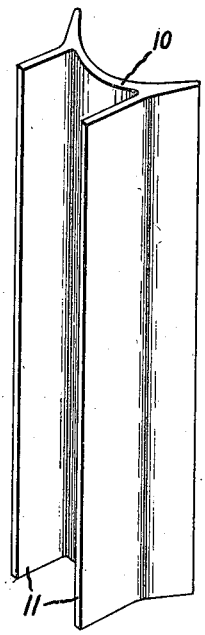
Figure 2:
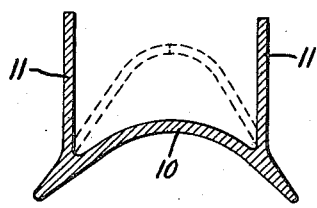
Figure 3:
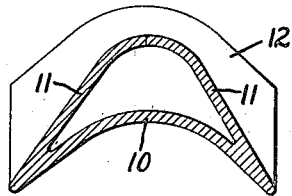
Figure 4:
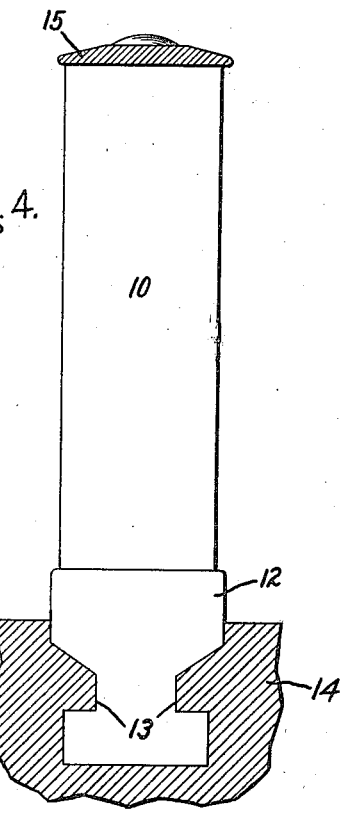

In the drawing Fig. 1 is a perspective view of stock used in forming blades in accordance with my method; Fig. 2 is a transverse sectional view of the structure shown in Fig. 1, and illustrating in dotted lines a further step employed in carrying out my invention; Fig. 3 is a view similar to Fig. 2 illustrating another step used in carrying out my invention; Fig. 4 shows a blade made in accordance with my invention mounted on a rotor or carrying member, and Fig. 5 shows a modification.

According to my invention I provide bucket stock such as that shown in Fig. 1 and comprising a face or front portion 10 of a curvature to form the face of the bucket and wings 11 adapted to form the back of the bucket. This stock may be formed in any suitable manner in strips and afterwards cut into proper lengths for forming the buckets. For example it may be formed by drawing. Either before or after being cut into bucket lengths, the wings 11 are curved around until their longitudinal edges meet or abut to form the back of the bucket, the meeting or abutting edges being fastened together by welding or in other suitable manner. This is indicated in dotted lines in Fig. 2. The bucket length, after being thus formed, is attached to a base 12 by welding, brazing or the like to provide a complete bucket structure. The base may be provided with suitable grooves 13 adapting the bucket to be fastened to a rotor or carrying member 14 by a dovetail connection or it may be shaped for other types of connection. At 15 is indicated a bucket cover for the buckets.

Figure 5:
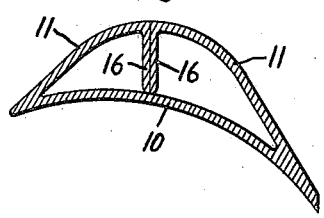

Fig. 5 shows a modification wherein the wings 11 are provided with extensions 16 which abut each other and also engage the front wall of the buckets thereby forming a longitudinal stiffening or strengthening web.

Viewed from another aspect, the stock from which my buckets are formed comprises a channel shaped portion from the corners of which project longitudinally extending curved ears which form the face of the bucket.

By the above described method I am enabled to form turbine blades or buckets at a low cost and without waste of material. At the same time the buckets are strong and light and are easily provided with surfaces having the correct angles.

In accordance with the provisions of the patent statutes, I have described the principle of operation of my invention, together with the particular method which I now consider to represent the best manner for carrying it out but I desire to have it understood that the particular method disclosed is only illustrative and that the invention may be carried out with such modifications as come within the scope of the appended claims.

What I claim as new and desire to secure by Letters Patent of the United States, is,—

1. The method of manufacturing a turbine bucket which comprises taking a length of material having a curved portion for forming the face of the bucket and rearwardly projecting wings, bending the wings around until their longitudinal edges meet, and then fastening the meeting edges together.

2. The method of manufacturing a turbine bucket which comprises taking a length of material having a curved portion for forming the face of the bucket and rearwardly projecting wings, bending the wings around until their longitudinal edges meet, fastening the meeting edges together, and then attaching the sructure thus formed to a base member.

3. The method of manufacturing a turbine bucket which comprises taking a length of material having a curved portion for forming the face of the bucket and rearwardly projecting wings provided with angular extensions, bending the wings around until their longitudinal edges meet and the extensions engage each other and the rear wall of the face of the bucket, and then fastening the contacting surfaces together.

In witness whereof, I have hereunto set my hand this 18th day of November, 1922.

JAMES WILKINSON.